United States Patent Office 3,496,520
Patented Feb. 17, 1970

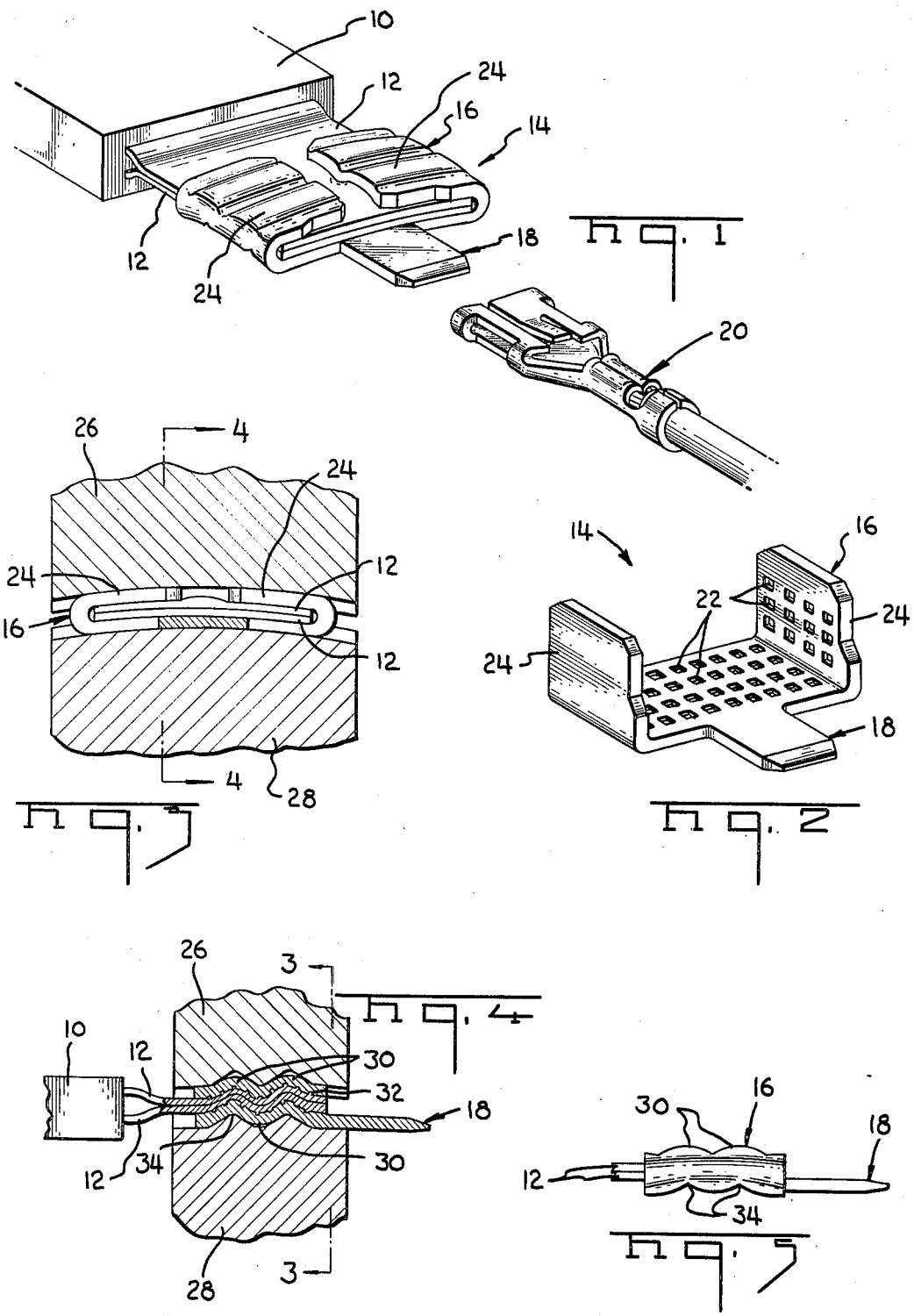

3,496,520
FUEL CELL TAB
Charles Edward Reynolds, Harrisburg, Pa., assignor to AMP Incorporated, Harrisburg, Pa.
Filed May 11, 1967, Ser. No. 637,735
Int. Cl. H01r 9/06, 11/20
U.S. Cl. 339—95                                  5 Claims

ABSTRACT OF THE DISCLOSURE

The tantalum plates extending from a fuel cell are joined by a tab which is crimped to the plates. The crimp configuration provides serrations and longitudinal and transverse curvature to produce a firm mechanical and electrical connection.

BACKGROUND OF THE INVENTION

Field of the invention

Power take-offs for fuel cells or similar energy producing means.

Description of the prior art

Fuel cell plates are presently terminated by passing a nut and bolt through the plates to secure the plates together and provide an electrical terminal.

SUMMARY OF THE INVENTION

The invention provides an effective means of terminating the plates of a fuel cell. The crimp performs a scrubbing action on the plates to remove oxide buildup. Prior art techniques have been found to be unsatisfactory since they break down under the acid atmosphere within which the fuel cell functions. The present termination resists the acid atmosphere, retains a strong mechanical hold on the plates, and provides good electrical conductivity from the plates to the external power take-off.

BRIEF DESCRIPTION OF THE DRAWING

FIGURE 1 is an exploded perspective view showing the fuel cell tab of the present invention;

FIGURE 2 is a perspective view of the tab in an open position prior to being connected to a fuel cell;

FIGURE 3 is a cross-sectional view taken along the line 3—3 of FIGURE 4 and showing the tab being joined to the plates of a fuel cell;

FIGURE 4 is a cross-sectional view taken along the line 4—4 of FIGURE 3 and showing details of the crimp configuration of the tabs; and FIGURE 5 is a side elevational view showing further details of the tab.

DESCRIPTION OF THE PREFERRED EMBODIMENT

The attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purpose of illustration in order that others skilled in the art may fully understand the invention and the principles thereof and the manner of applying it in practical use so that they may modify it in various forms, each as may be best suited to the conditions of a particular use.

In FIGURE 1 there is shown a fuel cell 10 having a pair of plates 12 extending therefrom. The plates 12 are an integral part of the fuel cell and must be joined to provide a means for directing the energy produced by the fuel cells to an external power take-off or external circuitry.

Fuel cells normally operate in a high temperature phosphoric acid atmosphere, such atmosphere constituting the catalyst for the fuel cell. In such an atmosphere the tantalum plates of the cell react instantly with oxygen and form a stable oxide film which is current blocking. This high dielectric film must be penetrated if current is to pass outward from the cell.

The fuel cell tab of the present invention is indicated generally at 14 in FIGURES 1 and 2 and comprises a first portion 16 which is secured to the plates 12 and a second portion 18 integral with the first portion and serving as a terminal for connection with a lead 20 extending to the power take-off. The first portion 16, as shown in FIGURE 2, is of substantially U-shaped configuration and has a plurality of indents 22 formed in its inner surface. The upstanding ears 24 of the tab are folded down upon themselves as seen in FIGURE 1 to enclose the plates therebetween in a manner to be described.

A pair of crimping dies 26 and 28 are shown in FIGURES 3 and 4 and serve to apply the tab to the plates 12. The dies 26 and 28 produce a crimped configuration having a series of serrations 30 extending transversely through the tab. The serrations produce a rippled effect in the plates 12 and thus serve to scrub the plates and remove the oxide film. The indents 22 of the tab permit small portions 32 of the plates to flow into the indents thus increasing the force of the mechanical connection and additionally serving to break through the oxide buildup covering the outer surface of the plates.

The tab 14 is given an arcuate form (see FIGURE 3) in order to maintain the tab in a closed position. The curvature of the tab plus the grooves 34 produced by the serrations act as a mechanical stiffener in maintaining the tab in a locked position on the plates. The curvature, as seen in FIGURE 3, extends about a longitudinal axis passing through the first and second portions of the tab. For additional stiffening of the tab there is provided an arcuate curvature to the first portion of the tab extending about a transverse axis (see FIGURE 5). This compound curvature acting in cooperation with the grooves 34 permits the tab to remain locked for an extended time despite the high temperature corrosive acid atmosphere within which the tab must function.

The tab 14 is preferably formed from stainless steel and carries a gold plating for resisting corrosion and for increasing the conductivity of the tab. Penetration of the gold plating on the tab is to be avoided during the crimp and therefore the crimp is applied to the tab throughout the entire area of the first portion 16. This large crimping area distributes stresses and negates the possibility of penetrating the plating to expose the bare tab beneath. The plates 12 are stretched and formed within the crimping area to distort the surfaces of the plates to aid in exposing the bare metal of the plates to permit current flow.

Changes in construction will occur to those skilled in the art and various apparently different modifications and embodiments may be made without departing from the scope of the invention. The matter set forth in the foregoing description and accompanying drawings is offered by way of illustration only.

What is claimed is:

1. A tab for joining together a pair of electrically conductive plates comprising a first portion crimped to said plates, and a second portion integral with said first portion and extending longitudinally therefrom to provide a terminal for carrying current to external circuitry, said first portion comprising a pair of ears folded back upon themselves to provide surfaces on opposing sides of said plates, said ears being arcuately bowed about a first axis extending longitudinally of said first and second portions and being arcuately bowed about a second axis extending normally to said first axis, said plates being bowed in two directions when said first portion is crimped to said plates to provide a firm mechanical and electrical union therebetween.

2. A tab as set forth in claim 1 wherein said first and second portions are formed from stainless steel, and a gold plating completely covering said steel for preventing corrosion and increasing the electrical conductivity of said tab.

3. A tab as set forth in claim 1 further comprising a plurality of serrations in said ears causing a rippling of said plates for scrubbing the outer surfaces thereof.

4. A tab set forth in claim 3 further comprising a plurality of indents disposed in the inner surfaces of said ears for pentrating the outer surfaces of said plates.

5. A tab as set forth in claim 3 wherein said serrations comprise a plurality of grooves which bite into said plates and serve to stiffen the ears of said tab to prevent relaxation of the crimped area.

References Cited

UNITED STATES PATENTS

| 1,894,327 | 1/1933 | Schellenger. | |
| 1,925,856 | 9/1933 | Vaughan. | |
| 2,735,997 | 2/1956 | Peterson | 339—258 |
| 3,124,641 | 3/1964 | Anderson | 174—84 |

MARVIN A. CHAMPION, Primary Examiner

JOSEPH H. McGLYNN, Assistant Examiner

U.S. Cl. X.R.

136—135; 174—94; 339—276, 278